United States Patent [19]

Byth

[11] 3,932,296

[45] Jan. 13, 1976

[54] CORROSION INHIBITOR

[75] Inventor: Nancy J. Byth, Tulsa, Okla.

[73] Assignee: The Dow Chemical Company, Midland, Mich.

[22] Filed: May 29, 1973

[21] Appl. No.: 364,385

[52] U.S. Cl............... 252/148; 21/2.5 R; 21/2.7 R; 134/3; 134/41; 252/8.55 E; 252/392
[51] Int. Cl.²... C11D 7/32; C11D 7/08; C23G 1/06; C23F 11/14
[58] Field of Search............... 252/148, 392, 8.55 E; 21/2.7 R, 2.5 R; 134/3, 41

[56] References Cited
UNITED STATES PATENTS

| | | | |
|---|---|---|---|
| 3,077,454 | 2/1963 | Monroe et al. | 252/148 |
| 3,404,094 | 10/1968 | Keeney | 252/148 |
| 3,634,270 | 1/1972 | Engle et al. | 252/149 |
| 3,658,720 | 4/1972 | McDougall et al. | 252/148 |
| 3,779,935 | 12/1973 | McDougall et al. | 252/148 |

Primary Examiner—Leland A. Sebastian
Assistant Examiner—Irwin Gluck
Attorney, Agent, or Firm—Bruce M. Kanuch

[57] ABSTRACT

The corrosion inhibitor of the present invention comprises a mixture containing (a) the reaction product of a nitrogen containing compound containing at least one active hydrogen attached to the nitrogen atom per molecule; a ketone having at least one hydrogen atom attached to the carbon atom alpha to the carbonyl group; an aldehyde; a fatty acid, and a quaternary ammonium compound and (b) a secondary quaternary compound which is different from the quaternary compound employed to prepare the reaction product. The inhibitor is added to acidic media which comes into contact with a metal to be protected.

5 Claims, No Drawings

CORROSION INHIBITOR

BACKGROUND OF THE INVENTION

U.S. Pat. Nos. 3,077,454 and 3,634,270, the teachings of which are specifically incorporated herein by reference, teach certain inhibitors which can be employed to reduce the attack of acidic media on metals in such processes as acidizing petroleum producing formations and in industrial cleaning operations. The corrosion inhibitor of the present invention is similar to those taught in these patents. However, it has certain unexpected characteristics not possessed by the general class of inhibitors taught in U.S. Pat. No. 3,077,454 and 3,634,270. For example, in U.S. Pat. No. 3,634,270 it is taught that a sulfur compound (allyl thiourea) must be employed in combination with the basic nitrogen inhibitor to provide an effective inhibitor.

SUMMARY OF THE INVENTION

In preparing the reaction product portion of the inhibitor of the present invention a nitrogen compound containing at least one active hydrogen attached to the nitrogen atom per molecule is reacted with a ketone having at least one hydrogen atom attached to the carbon atom alpha to the carbonyl group, an aldehyde, a fatty acid, and a quaternary ammonium compound preferably in the presence of an acid catalyst, at a temperature of from about 150° to about 250°F for from 1 to about 24 hours. It is preferable, but not essential, to carry out the above reaction in the presence of a solvent such as a glycol or polyglycol. If the solvent is not employed in the reaction it has been found advantageous to add it after reaction to facilitate handling. This product is then mixed with a second quaternary ammonium compound which is different from the quaternary ammonium compound employed to prepare the reaction product.

DETAILED DESCRIPTION OF THE INVENTION

A preferred embodiment for preparing the inhibitor of the present invention is to first prepare the reaction product by reacting about 1 mole of active hydrogen compound with from about 2 to about 10 moles of aldehyde; from about 1.5 to about 10 moles of ketone; and 0 to 5 moles of acid catalyst if desired; and from about 0.005 to about 0.10 mole of a quaternary ammonium compound and from 0.3 to 24, preferably from 0.3 to 3 parts by weight, based on the above reactants, of a fatty acid, at a temperature from about 65 to about 120°C (150° to 250°F) for from 1 to 24 hours, in the presence of a glycol, e.g. ethylene glycol. Upon completion of the reaction additional fatty acid may be added with stirring to bring the weight ratio of fatty acid to reaction product to 0.3 to 24 parts by weight of acid per part of reaction product.

The corrosion inhibitor of the present invention is then prepared by blending or otherwise mixing together from about 20 to about 90 parts by volume of the reaction product with 0 to about 50 parts by volume of an acetylenic alcohol, 0 to about 80 parts by volume of a lower molecular weight alkyl alcohol; 0 to about 20 parts by volume of a surfactant (other than a quaternary ammonium compound) and from about 0.5 to about 10 parts by volume (based on the active portion) of a second quaternary ammonium compound which is different from the first quaternary ammonium compound employed to prepare the reaction product.

Preferably the corrosion inhibitor comprises from about 40 to about 55 parts by volume of the reaction product, 8 to about 12 parts by volume of an acetylenic alcohol, 30 to about 40 parts by volume of a lower molecular weight alkyl alcohol ($C_1$ to $C_8$); 2 to about 8 parts by volume of a surfactant (other than a quaternary ammonium compound) and 0.5 to about 5 parts by volume (based on the active ingredient) of a second quaternary ammonium compound.

The active hydrogen compounds which can be employed to prepare the nitrogen component of the present invention are those organic ammonia derivatives having at least one hydrogen atom attached to nitrogen, as for example, primary and secondary amines, diamines, amides, ureas, thioureas, ammonia and ammonium salts, alicyclic amines, heterocyclic amines, aromatic amines, imidazolines containing a N-amine substituted side chain and the like which contain no group reactive under the conditions of the reaction other than hydrogen attached to nitrogen. Some of such compounds which have been found effective are the normal alkylamines having from 1 to 20 or more carbon atoms in the alkyl substituent, as for example, methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, non-aldecylamine, eicosylamine and mixtures thereof. The isoalkyl and ter-alkylamines having up to 20 carbon atoms in the alkyl substituent such as, for example, isopropylamine, isobutylamine, isoamylamine, and the like, ter-butylamine, ter-amylamine and the like, the dialkylamines having from 1 to 20 alkyl groups in the alkyl substitutents such as dimethylamine, diethylamine, dipropylamine, dibutylamine, diamylamine, dihexylamine, diheptylamine, dioctylamine, didecylamine, dioctadecylamine and the like, as well as the diiso and tertiary alkylamines, and mixtures thereof. The diamines which are useful as the active hydrogen compound include those diamines having from 1 to 20 carbon atoms in the alkyl portions thereof such as methylenediamine, ethylenediamine, propylenediamine, butylenediamine, diaminopentane (see pentylenediamine), diaminohexane (hexylenediamine) and the like. In addition other nitrogen containing compounds having an active hydrogen on the nitrogen atom such as ammonia ureas, thioureas, amides, ammonium salts and alicyclic, heterocyclic and aromatic amines are operative as the active hydrogen compound in accordance with the present invention. Thus, one can employ ammonia, urea, thiourea, 1-acetyl-2-thiourea, N-allylthiourea, dithiobiuret, 1-phenyl-2-thiourea, 1,3-di(Rosin Amine D) thiourea, 1,3-dibutylthiourea and the like, acetamide, N-1-naphthylacetamide, oxamide, acetamide, adipamide, propionamide, thioacetamide, malonamide, formamide, alpha-cyanoacetamide, succinamide, n-butyramide, acetamide, dimethylacetamide, N-methylacetamide, n-butyloxamate, hexanaamide, phthalimide, n-valeramide, isobutyramide, Armid 12 (95% dodecanamide, 4% tetradecanamide, 1% decanamide). N,N'-dibenzyldithiooxamide, dithiooxamide, Armid C (Amide of cocoa fatty acids). 1-naphthaleneacetamide, Armid O (91% oleamide, 6% stearylamide, 3% linolamide, N,N'-dimethylthiooxamide, acetanilide, Armid HT (75% stearylamide, 22% palmitamide, 3% oleamide), nonanamide, N,N'-dicyclohexyldithiooxamide, benzamide, B-isothioureidopropionic acid, N,N'-bis(hydroxymethyl)-dithiooxamide, and the like, 2-methylpiperazine, morpholine, pyrrolidine, 2-aminoethylpiperazine, and the like, 2-naphthylamine, benzylamine, 2-aminopyridine, aniline and the like, 1,3-diphenyltriazine, and the like, ammonium chloride, monobasic ammonium phosphate, ammonium acetate, ammonium thioocyanate, ammonium oxalate, dibasic sodium ammonium phosphate and the like as well as the imidazolines such as 2-aminoethyl-1-n-heptyl-2-imidazoline, and the like, are effective sources of active hydrogen in accordance with the present invention.

The ketones which are operative in accordance with the present invention are those having at least one hydrogen atom on the carbon atom alpha to the carbonyl group. Some of such ketones found to be effective are the aliphatic and aryl substituted aliphatic ketones and mixtures thereof as, for example, acetophenone, 1-acetonaphthone, 1 part acetophenone + 1 part acetone, p-methoxyacetophenone, propiophenone, p-chloroacetophenone, isophorone, tetrolophenone, 2,4-pentanedione, Ketosol (75% phenethyl alcohol, 25 percent acetophenone), 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and the like.

The class of fatty acids found to be operative include the alkyl carboxylic acids having from 1 to 20 carbon atoms, the olefinic carboxylic acids having from 2 to 20 carbon atoms and having from 1 to 2 or more unsaturated sites along the chain. In addition the various alkylene oxide adducts of the above acids have been found effective. Thus one can employ rendered animal fat, octanoic acid, myristic acid, pelargonic acid, abietic acid, acetic acid, lauric acid, formic acid, oleic acid, capric acid, tall oil (an oily mixture of rosin acids, fatty acids and other materials obtained by acid treatment of alkaline liquor from the digesting of pine wood), coco fatty acids + 15 moles ethylene oxide, oleic acid + 15 moles ethylene oxide, 70% rosin fatty acids + 15 moles ethylene oxide, tall oil + 4 moles propylene oxide + 8 moles ethylene oxide, tall oil + 6 moles propylene oxide + 12 moles ethylene oxide, tall oil + 8 moles propylene oxide + 8 moles ethylene oxide, tall oil + 4 moles propylene oxide + 12 moles ethylene oxide, tall oil + 4 moles propylene oxide + 10 moles ethylene oxide, tall oil + 6 moles propylene oxide + 8 moles ethylene oxide, tall oil + 6 moles propylene oxide + 10 moles ethylene oxide, and the like.

The class of aldehydes which are operative in accordance with the present invention include the aldehydes having from 1 to 16 or more carbon atoms. Thus one can employ formaldehyde, urotropine, benzaldehyde, hexanol, octanol, decanol, hexadecanol, paraformaldehyde and the like.

Surfactants which can be employed with the inhibitor are those selected from the classes known as anionic, nonionic, cationic and amphoteric. Some of such surfactants are the mono and dialkyl phenols condensed with 10 to 50 moles of ethylene oxide such as the nonylphenols condensed with from 10 to 50 moles of ethylene oxide, disecondary butyl phenol condensed with from 5 to 30 moles of ethylene oxide, and the like, the polyethylene glycol alkyl mercaptans such as polyethylene glycol tertiary dodecyl mercaptan, ammonium isopropylbenzeneparafulfonate, diethanolamide of coconut oil, the difatty alkyl quaternary ammonium chlorides of mixed fatty alkyls such as octyl, decyl, dodecyl, tetradecyl, hexadecyl, octadecyl and the like.

The alkynyl (acetylenic) alcohols which can be employed in the inhibitors of the present invention are those acetylenic alcohols having from 3 to 10 carbon atoms such as 1-propyn-3-ol, 1-butyn-3-ol, 1-pentyn-3-ol, 1-hexyn-3-ol, 1-heptyn-3-ol, 1-octyn-3-ol, 1-nonyl-3-ol, 1-decyn-3-ol, and the like. The following alkynols are useful at temperatures below about 150°F 1-ethynylcyclohexanol, methylbutynol, methylpentynol, butynediol and the like.

The acid catalyst which can be employed in preparing the inhibitor are the mineral acids such as sulfuric, hydrochloric, phosphoric and the strong organic acids such as formic, acetic, propionic acids, and the like.

The quaternary ammonium compound which can be employed as a material of the reaction product and the second quaternary compound of the corrosion inhibitor comprises an organic nitrogen compound in which the molecular structure includes a nitrogen atom attached to four individual organic groups, pentavalent nitrogen ring compounds such as lauryl pyridinium chloride and the like. Selected classes of quaternary ammonium compounds include those generally corresponding to the formulas

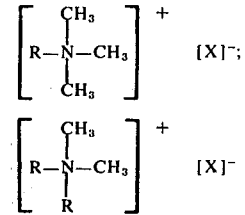

wherein the R groups can be the same or different organic groups such as straight branched, or cyclic; saturated or unsaturated, substituted or unsubstituted groups containing from about 2 to about 18 carbon atoms, and X is an anion such as chloride, iodide, bromide, sulfate and the like. Specific quaternary compounds which can be employed include, for example, alkyl benzyl dimethyl ammonium chloride wherein the alkyl group contains from about 8 to about 18 carbon atoms; alkyl trimethyl ammonium chloride wherein the alkyl group is selected from octyl, decyl, dodecyl, tetradecyl, hexadecyl, octadecyl, octadecenyl, octadecadeenyl; dialkyl dimethyl ammonium chloride wherein the alkyl groups are the same or different members of the groups of alkyl radicals set forth above the alkyl trimethyl ammonium chloride; quaternary ammonium chloride, corresponding to the formula

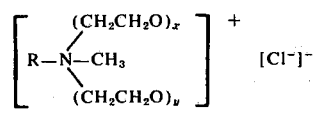

wherein R is a $C_8$ to $C_{18}$ hydrocarbon and $x$ and $y$ can range from about 1 to 20, mixtures of the various quaternary ammonium compounds and the like.

The reaction product employed in the corrosion inhibitor of the present invention can be prepared by reacting, as percent by weight, from about 1 to about 20 (preferably about 4 to about 6) percent of the nitrogen compound having at least one active hydrogen attached to the nitrogen per molecule, with from 6 to about 60 (preferably about 25 to about 30) percent of the ketone, from about 1 to about 40 (preferably about 18 to about 22) percent of an aldehyde, from about 10 to about 80 (preferably about 40 to about 50) percent of a fatty acid, and from about 0.5 to about 10 (preferably about 1 to about 2) percent of a quaternary ammonium compound.

A preferred inhibitor composition comprises (20 to 90 percent by volume preferably from about 40 to 55 percent) of the reaction product of, as percent by weight, isopropylamine, 1 to 20 percent, preferably 4 to about 6 percent; tall oil, 10 to about 80 percent, preferably 40 to about 50 percent; acetophenone, 6 to about 60 percent, preferably 25 to about 30 percent; paraformaldehyde, 1 to about 40 percent, preferably 18 to 22 percent; and a quaternary amine, 0.5 to about 10, preferably about 1 to about 2 percent, said reaction product being mixed with 0 to about 50 percent by volume, preferably 8 to about 12 percent by volume of hexynol, and 0.5 to about 10, preferably 0.5 to about 5 percent by volume of a second quaternary ammonium compound different from the quaternary ammonium compound employed to prepare the reaction product.

The corrosion inhibitor of the present invention is useful for reducing the attack of metals by such acids as hydrochloric acid, phosphoric acid, sulfuric acid, hydroxyacetic acid, formic acid, sulfamic acid, citric acid and other similar mineral and organic acids. The corrosion inhibitor is also effective in the presence of acidic media also containing various complexing agents such as urea compounds, e.g., thiourea, EDTA (ethylene diamine tetra acetic acid) and the like. The amount of inhibitor to be employed in an acidic media will vary depending on such factors as the temperature of the environment to be protected, the type of acid to be inhibited, the type of metal to be protected and the like. Generally the corrosion inhibitor should be present in a minimum amount of about 0.01 percent by weight of the acidic media to be inhibited. The maximum amount is primarily dictated by economic considerations.

EXAMPLE 1

In the following series of tests various reaction products were prepared and then blended with various other constituents to provide a final formulation. The effectiveness of the formulation to inhibit the corrosion rate of a 15 percent by weight HCl aqueous solution was then determined. The corrosion rate was determined by blending 1 percent of the formulation into the HCl solution and then a coupon composed of N80 steel was immersed into the solution. The solution was at a temperature of 250°F. The coupon was immersed in the solution for a period of 6 hours under a pressure of 5000 psi. The corrosion rate and evidence of pitting was determined for each test and expressed as lb/sq ft/day. The amount of pitting was ranked by numerals 0 through 9. The ranking system is defined in the following Table I.

TABLE I

| Rank | Pitting Rank |
|---|---|
| 0 | No pits. Surface same as for original untreated coupon. |
| 1 | Sintered edges (slightly etched edges similar to 200 grade sand paper) but not pits on |

TABLE I-continued

| Rank | Pitting Rank |
|---|---|
|  | major surfaces. |
| 2 | Very shallow pits less than pencil point size on edges only. |
| 3 | Scattered, very shallow pin-point pits, less than 25 in number on either surface (i.e., front and/or back). |
| 4 | Very shallow pin-point pits on either surface to a greater extent than in Rank 3 above. Usually 25-100 over coupon. No major pits as described in 5 below. |
| 5 | Ten or less 1/32" to 1/16" diameter, 1/64" to 1/32" deep. |
| 6 | 11-25 pits of type described in Rank 5 above. |
| 7 | More than 25 pits of type described in Rank 5 above. |
| 8 | Pits larger than 1/16" but less than 1/8" in diameter, 100 or less in number. |
| 9 | Any pitting more severe than Rank 8 above. |

Coupons with pitting rates of 1-4 are acceptable.

The reaction products (A through G) were prepared by reacting the constituents listed in the following Table II at a temperature of about 200° to 215°F for about 6 hours, removing excess water and recovering the product.

TABLE II

Reaction Product A

Reaction product of 660 gallons tall oil with 3280 pounds acetophenone; 2479 pounds flake paraformaldehyde; and 1268 pounds of a mixture of compounds corresponding to the formula

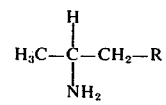

wherein R is a straight chain alkyl group containing from 10 to 20 carbon atoms. The reaction product is formulated with 386 gallons to tall oil, 227 gallons methyl alcohol, 227 gallons kerosene, 2908 pounds of an adduct of 5 moles of ethylene oxide and lauryl alcohol and 1513 pounds of hexynol.

Reaction Product B

Reaction product of 582 gallons of tall oil with, 338 gallons acetophenone, 80 gallons of monoisopropylamine, and 200 pounds of flake paraformaldehyde. The reaction product is formulated with other constituents to provide, as percent by volume 45.5 percent reaction product, 9.1 percent hexynol, 4.5 methyl ethyl ketone; 13.6 percent toluene, 18.2 ethylene glycol monobutyl ether, 7.8 percent (70% active) HF and 1.3 percent H₂O.

Reaction Product C

Reaction product of, as percent by weight, 43.3 percent tall oil, 28.3 percent acetophenone, 19.7 percent paraformaldehyde, 45 percent monoisopropylamine and 1.2 percent Ethoquad C12 (see Table III footnote 4). The reaction product is formulated with the following constituents to provide a blend of as percent by volume, 48 percent reaction product, 10 percent hexynol, 18 percent methyl alcohol, 12 percent n-butyl alcohol, 6 percent E867 and 6 percent of an adduct of 5 moles of ethylene oxide with lauryl alcohol.

Reaction Product D

Reaction product of 155 mililiters (mls) tall oil, 90 mls acetophenone, 64.5 grams paraformaldehyde, 100 mls H$_2$O, 21.3 mls monoisopropylamine and 4 mls of a mixture of quaternized alkyl quinolines.

Reaction Product E

Same as Reaction Product D except no water was added and 4 mls of a mixture of quaternized alkyl pyridines were employed.

Reaction Product F

Same as Reaction Product D except 6 mls of the mixture of quaternized alkyl quinolines were employed.

Reaction Product G

Same as Reaction Product F except mls of the mixture of quaternized alkyl pyridines were employed instead of Quinoline Quat.

The formulations tested, the amount of pitting and the corrosion rate are set forth in the following Table III.

TABLE III

Formulations
All Figures are Per Cent by Volume

| a | b | c | d | e | f | g | h | i | j | k | l | m | n | o |
|---|---|---|---|---|---|---|---|---|---|---|---|---|---|---|
| 1 | A | 48 | 10 | — | 7 | 21 | 5 | — | — | — | 9 | — | 5 | 0.075 |
| 2 | A | 48 | 10 | — | 6 | 21 | 5 | — | — | — | 10 | — | 9 | 0.056 |
| 3 | A | 48 | 10 | — | 3 | 24.5 | 3 | — | — | — | 11.5 | — | 9 | 0.150 |
| 4 | A | 48 | 10 | — | — | 26.5 | 4 | — | — | — | 11.5 | — | 9 | 0.180 |
| 5 | A | 48 | 10 | — | — | — | 30.5 | — | — | — | 11.5 | — | 9 | 0.085 |
| 6 | A | 48 | 10 | — | — | — | 30.9 | — | — | — | 11.1 | — | 0 | 0.032 |
| 7 | A | 48 | 10 | — | — | — | 11 | 20 | — | — | 11 | — | 4 | 0.035 |
| 8 | A | 48 | 10 | — | — | — | 37 | — | — | — | 5 | — | 4 | 0.046 |
| 9 | A | 48 | 10 | — | — | — | 36 | — | — | — | 6 | — | 4 | 0.052 |
| 10 | A | 48 | 10 | — | — | — | 35 | — | — | — | 7 | — | 4 | 0.051 |
| 11 | A | 48 | 10 | — | — | — | 34 | — | — | — | 8 | — | 0 | 0.040 |
| 12 | A | 48 | 10 | — | — | — | 33 | — | — | — | 9 | — | 0 | 0.070 |
| 13 | A | 48 | 10 | — | — | — | 32 | — | — | — | — | 10% cocoa amine | 0 | 0.058 |
| 14 | A | 48 | 10 | — | — | — | 32 | — | — | — | — | 10% R-7 (Tret-O-Lite) | 4 | 0.060 |
| 15 | A | 48 | 10 | — | — | — | 32 | — | — | — | — | 10% R66 (Tret-O-Lite) | 4 | 0.049 |
| 16 | A | 48 | 10 | — | — | — | 32 | — | 5 | — | — | 5% Armeen C (Armour) | 9 | 0.041 |
| 17 | A | 48 | 10 | — | — | — | 32 | — | 3 | — | — | 7% Armeen C | 6 | 0.099 |
| 18 | A | 48 | 10 | — | — | — | — | 32 | 5 | — | — | 5% R66 | 9 | 0.330 |
| 19 | B | 48 | 10 | — | — | — | 21 | 10 | — | — | 11 | — | 0 | 0.039 |
| 20 | A | 48 | 10 | — | — | — | 27 | 10 | — | — | — | 5% Quatrene CA (Textilana) | 9 | 0.400* |
| 21 | A | 48 | 10 | — | — | — | 21 | 10 | — | — | — | 10% Quatrene CA | 9 | 0.400* |
| 22 | A | 48 | — | 10 | — | — | 21 | 10 | — | — | 11 | — | 1 | 0.029 |
| 23 | A | 48 | 10 | — | — | — | 27 | 10 | — | — | — | 5% Quatrene CE (Textilana) | 0 | 0.073 |
| 24 | A | 48 | 10 | — | — | — | 21 | 10 | — | — | — | 10% Quatrene CE | 2 | 0.180* |
| 25 | A | 48 | 10 | — | — | — | 29 | 10 | — | — | — | 3% Quatrene CE | 1 | 0.067 |
| 26 | A | 48 | 10 | — | — | — | 31 | 10 | — | — | — | 1% Quatrene CE | 6 | 0.056 |
| 27 | A | 48 | 10 | — | — | — | 30 | 10 | — | 1 | — | 1% Quatrene CE | 9 | 0.182 |
| 28 | A | 48 | 10 | — | — | — | 30 | 10 | — | — | — | 2% Quatrene CE | 0 | 0.050 |
| 29 | A | 48 | 10 | — | — | — | 29 | 10 | — | 1 | — | 2% Quatrene CE | 0 | 0.050 |
| 30 | B | 48 | 10 | — | — | — | 28 | 10 | — | 2 | — | 2% Quatrene CE | 2 | 0.045 |
| 31 | A | 48 | 10 | — | — | — | 27 | 10 | — | — | — | 5% Quatrene CB-80(1) | 0 | 0.065** |
| 32 | A | 48 | 10 | — | — | — | 27 | 10 | — | — | — | 5% Arquad C-50(2) | 5 | 0.069** |
| 33 | A | 48 | 10 | — | — | — | 27 | 10 | — | — | — | 5% Arquad 2C-75(3) | 9 | 0.970** |
| 34 | A | 48 | 10 | — | — | — | 27 | 10 | — | — | — | 5% Ethoquad C/12(4) | 9 | 0.266** |
| 35 | A | 48 | 10 | — | — | — | 27 | 10 | — | — | — | 5% Ethoquad C/25(5) | 6 | 0.056** |
| 36 | A | 48 | 10 | — | — | — | 29 | 10 | — | — | — | 3% Quatrene CB-80 | 4 | 0.060 |
| 37 | A | 48 | 10 | — | — | — | 31 | 10 | — | — | — | 1% Arquad C-50 | 8 | 0.095 |
| 38 | A | 48 | 10 | — | — | — | 31 | 10 | — | — | — | 1% Ethoquad C/12 | 5 | 0.050 |
| 39 | A | 48 | 10 | — | — | — | 29 | 10 | — | — | — | 8% Ethoquad C/25 | 3 | 0.057 |
| 40 | A | 48 | 10 | — | — | — | 28 | 8 | — | 4 | — | 20% Ethoquad C/12 | 3 | 0.074 |
| 41 | A | 48 | 10 | — | — | — | 28 | 10 | — | 2 | 2 | — | 0 | 0.060 |
| 42 | A | 48 | 10 | — | — | — | 28 | 7 | — | 2 | 5 | — | 0 | 0.083*** |
| 43 | A | 48 | 10 | — | — | — | 28 | 10 | — | 2 | — | 2% Quatrene CE | 0 | 0.106*** |
| 44 | A | 48 | 10 | — | — | — | 28 | 10 | — | 3 | — | 1% Quatrene CE | 0 | 0.106*** |
| 45 | A | 48 | 10 | — | — | — | 28 | 10 | — | 1 | — | 3% Quatrene CE | 0 | 0.140*** |
| 46 | A | 65 | 10 | — | — | — | 13 | 10 | — | 2 | — | — | 0 | 0.046 |
| 47 | A | 48 | 10 | — | — | — | 18 | 13 | — | 6 | — | 5% Quatrene CA | 0 | 0.056 |
| 48 | A | 48 | 10 | — | — | — | 20 | 12 | — | 6 | — | 4% Quatrene CA | 0 | 0.048 |
| 49 | C | 48 | 10 | — | — | — | 18 | 12 | — | 6 | — | 6% Quatrene CA | 3 | 0.053 |
| 50 | A | 48 | 10 | — | — | — | 20 | 14 | — | 6 | — | 2% Quatrene CA | — | — |
| 51 | A | 48 | 10 | — | — | — | 20 | 12 | — | 6 | — | 4% Quatrene CA | 3 | 0.034 |
| 52 | C | 48 | 10 | — | — | — | 21 | 14 | — | 6 | — | 1% Quatrene CA | 3 | 0.040 |
| 53 | A | 48 | 10 | — | — | — | 20 | 8 | — | 6 | — | 8% Quatrene CA | 5 | 0.060 |
| 54 | A | 48 | 10 | — | — | — | 22 | 12 | — | 6 | — | 2% Ethoquad C/12 | — | — |
| 55 | A | 48 | 10 | — | — | — | 20 | 12 | — | 6 | — | 4% Ethoquad C/12 | — | — |
| 56 | A | 48 | 10 | — | — | — | 22 | 10 | — | 6 | — | 4% Quatrene CA | 0 | 0.067 |
| 57 | A | 48 | 10 | — | — | — | 22 | 10 | — | 6 | — | 4% Quatrene CA | 6 | 0.080 |
| 58 | A | 48 | 10 | — | — | — | 22 | 10 | — | 4 | — | 6% Quatrene CE | 3 | 0.068 |

TABLE III-continued

| | | | | | | | Formulations All Figures are Per Cent by Volume | | | | | | | |
|---|---|---|---|---|---|---|---|---|---|---|---|---|---|---|
| a | b | c | d | e | f | g | h | i | j | k | l | m | n | o |
| 59 | D | 48 | 10 | — | — | — | 24 | 12 | — | 6 | — | — | 3 | 0.043 |
| 60 | D | 48 | 10 | — | — | — | 22 | 12 | — | 6 | — | 2% Quatrene CE | 0 | 0.063 |
| 61 | E | 60 | 10 | — | — | — | 17 | 6 | — | 6 | — | 1% Quatrene CE | 0 | 0.066* |
| 62 | E | 60 | 10 | — | — | — | 17 | 6 | — | 6 | — | 1% Quatrene CE | 0 | 0.062*** |
| 63 | E | 60 | 10 | — | — | — | 17 | 6 | — | 6 | — | 1% Quatrene CE | 0 | 0.060**** |
| 64 | C | 48 | 10 | — | — | — | 22 | 12 | — | 6 | — | 2% Quinquat | 0 | 0.057 |
| 65 | C | 48 | 10 | — | — | — | 22 | 10 | — | 6 | — | 4% Quinquat | 0 | 0.047 |
| 66 | C | 48 | 10 | — | — | — | 22 | 12 | — | 6 | — | 2% Quint | 3 | 0.077 |
| 67 | C | 48 | 10 | — | — | — | 22 | 10 | — | 6 | — | 4% Quinquat | 3 | 0.072 |
| 68 | F | 48 | 10 | — | — | — | 24 | 12 | — | 6 | — | — | 3 | 0.060 |
| 69 | G | 48 | 10 | — | — | — | 24 | 12 | — | 6 | — | — | 0 | 0.073**** |
| 70 | E | 60 | 10 | — | — | — | 18 | 6 | — | 6 | — | — | 0 | 0.064* |

*0.4% inhibitor
**0.7% inhibitor
***0.6% inhibitor
****0.8% inhibitor (1) 80 per cent active solution of alkyl ($C_{12}$ - 65 per cent by weight - $C_{14}$ - 25 per cent by weight and $C_{16}$ - 10 per cent by weight) benzyl ammonium chloride.
(2) Mixture of monoalkyl trimethyl ammonium chloride containing 8 per cent octyl, 9 per cent decyl, 7 per cent dodecyl, 18 per cent tetradecyl, 8 per cent hexadecyl, 5 per cent octadecyl, and 5 per cent octadecenyl.
(3) Mixture of monoalkyl trimethyl ammonium chloride containing 8 per cent octyl, 9 per cent decyl, 47 per cent dodecyl, 18 per cent tetradecyl, 8 per cent hexadecyl and 10 per cent octadecyl.
(4) A quaternary ammonium chloride compound corresponding to the formula

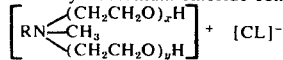

$$\left[ RN \begin{matrix} (CH_2CH_2O)_xH \\ CH_3 \\ (CH_2CH_2O)_yH \end{matrix} \right]^+ [CL]^-$$

wherein the source of alkyl radical is cocoafatty acid.
(5) A quaternary ammonium chloride as is (4) formed from reaction of cocoa fatty acid and 15 moles of ethylene oxide.
(6) 20 per cent by weight active mixture of ethoxylated esters and Quatrene CA and Quatrene CE.
(7) Adduct of 5 moles of ethylene oxide with lauryl alcohol.
a Test No.
b Reaction Product
c Amount of Reaction Product
d Hexynol
e Parpargyl Alcohol
f Toluene
g Ethylene Glycol n-butyl Ether
h Methanol
i n-butyl Alcohol
j Nonionic Surfactant
k Adduct(7)
l Amine(6) Mixture
m Amine
n Pitting
o Corrosion Rate (lb/sq ft)

What is claimed is:

1. A corrosion inhibitor comprising:
   a. the reaction product of about 1 mole of an organic ammonia derivative containing at least one active hydrogen attached to the nitrogen atom per molecule; from about 1.5 to about 10 moles of a ketone having at least one hydrogen atom attached to the carbon atom alpha to the carbonyl group, from about 2 to about 10 moles of an aldehyde; from about 0.3 to about 24 parts by weight, based on the other four reactants of a fatty acid containing from 1 to about 20 carbon atoms and from about 0.005 to about 0.10 mole of a first quaternary ammonium compound, in admixture with,
   b. from about 0.5 to about 10 parts by volume of a secondary quaternary ammonium which is different from the first quaternary ammonium compound.

2. The corrosion inhibitor of claim 1 wherein the reaction product comprises the reaction of about 1 mole of said nitrogen containing compound with about 1.5 to about 10 moles of said ketone, about 2 to about 10 moles of said aldehyde, about 0.3 to about 3 parts by weight of a fatty acid, and about 0.005 to about 0.10 mole of said first quaternary ammonium compound.

3. The corrosion inhibitor of claim 2 comprising from about 20 to about 90 parts by volume of said reaction product, 0 to about 50 parts by volume of an acetylenic alcohol corrosion inhibitor, 0 to about 80 parts by volume of a lower molecular weight alkyl alcohol, 0 to about 20 parts by volume of a surfactant and from about 0.5 to about 10 parts by volume of said second quaternary ammonium compound.

4. The corrosion inhibitor of claim 2 comprising from about 40 to about 55 parts by volume of said reaction product, from about 8 to about 12 parts by volume of an acetylenic alcohol, from about 30 to about 40 parts by volume of a lower molecular weight alkyl alcohol, 2 to about 8 parts by volume of a surfactant other than a quaternary ammonium compound, and 0.5 to about 5 parts by weight of a second quaternary ammonium compound.

5. An inhibited acid comprising:
   a. an acid and
   b. at least about 0.01 percent by weight of the inhibitor defined in claim 1.

\* \* \* \* \*